Nov. 30, 1965 F. F. CRAIG, JR., ETAL Re. 25,918
RECOVERY OF HEAVY OILS BY STEAM EXTRACTION
Original Filed Nov. 27, 1959
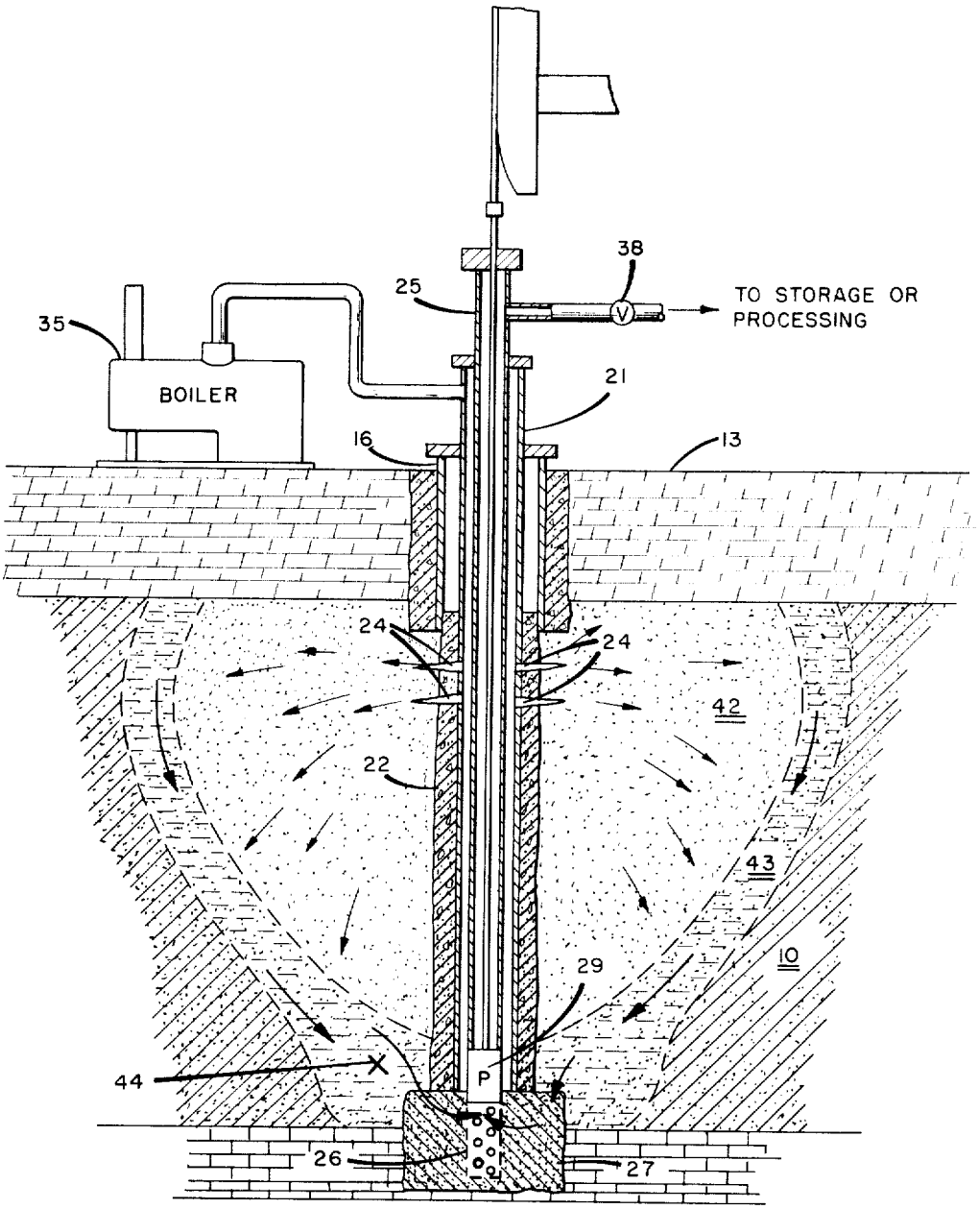
F. F. CRAIG, JR.
K. L. HUJSAK
INVENTORS:
BY Newell Potter
ATTORNEY United States Patent Office Re. 25,918
Reissued Nov. 30, 1965

25,918
RECOVERY OF HEAVY OILS BY STEAM EXTRACTION

Forrest F. Craig, Jr., and Karol L. Hujsak, both of Tulsa, Okla., assignors to Pan American Petroleum Corporation, Tulsa, Okla., a corporation of Delaware Original No. 3,155,160, dated Nov. 3, 1964, Ser. No. 855,510, Nov. 27, 1959. Application for reissue Jan. 25, 1965, Ser. No. 443,735
10 Claims. (Cl. 166—40)

Matter enclosed in heavy brackets [ ] appears in the original patent but forms no part of this reissue specification; matter printed in italics indicates the additions made by reissue.

This invention relates to oil recovery and is directed particularly to the recovery of heavy oils, tars, or bitumens from the underground strata in which they occur. Specifically, it is directed, but not limited to the in-place treatment and recovery of solid or semisolid hyrdocarbons, tars, or bitumens, one of the most notable examples of which is the bitumen in the McMurray bituminous sand outcropping along the Athabasca River in Canada.

This invention is an improvement upon the invention of U.S. Patent 2,881,838 for the recovery of heavy hydrocarbons by injecting steam into the deposit and recovering the hydrocarbons therein which flow by gravity drainage to the base of a single well. It is a characteristic of these oils that they are substantially nonflowable under reservoir conditions by the application of driving-fluid pressure. Furthermore, the reservoirs in which they occur generally lack any substantial sources of natural driving energy such as a natural water or gas drive.

The process described in that patent has been proved operable for the recovery of heavy oils, but for oils of the very high viscosity characterizing the Athabasca tar, it is subject to the drawback that the force of gravity drainage is able at best to produce only a small rate of flow into the well bore. This is because, even at the heat level produced by steam at an elevated pressure, the tar still has an appreciable viscosity which slows down its flow. For example, even at the 400° F. temperature of saturated steam at a pressure of 235 pounds per square inch gauge, the Athabasca tar viscosity is still about 8 centipoises. Thus, even though tar with this viscosity can ultimately be produced solely by gravity drainage, the time required to recover the tar which can be readily heated from a single well is so long that substantial losses of heat to the overburden occur. Thus, the substantial fraction of the injected steam required to make up for these heat losses constitutes an economic waste.

In view of the foregoing, it is a primary object of our invention to overcome the drawback of low producing rates in a process of the type described, by supplementing the gravity-drainage driving forces available to move the heated oil to the well bore. It is a further object of the invention to provide a method of heavy-oil recovery utilizing steam injection and gravity flow around a single well bore wherein the flow of oil to the well bore is substantially augmented, loss of heat to the overburden is reduced, the ratio of steam injected to oil recovered is lowered, and the time to carry the recovery operation to completion is reduced. Other and further objects, uses, and advantages of the invention will become apparent as the description proceeds.

Briefly stated, we have found by experimental studies that the foregoing objects can be accomplished by a method which is a series of alternating pressuring and depressuring steps, appropriately timed, wherein each pressuring step comprises injecting steam into the formation while holding back pressure and withdrawing liquids at about the same rate as they accumulate at the well bore, exactly as disclosed and claimed in said Patent 2,881,838. Each depressuring step, taken after a substantial body of melted tar and steam condensate has accumulated within the formation, comprises releasing the back pressure and withdrawing fluids from the bottom of the well as rapidly as possible to reduce the pressure there to a low value. This establishes a pressure gradient throughout the heated volume of formation and, by revaporizing some of the condensate, thereby aids the force of gravity drainage in bringing the melted tar and condensate to the well bore for recovery.

That is to say, each step or period of injecting steam at an elevated temperature and pressure into the formation as described in the afore-mentioned patent is continued for a period of time such that a large body of oil will be contacted and have its temperature raised. Then the introduction of steam into the upper portion of the reservoir is discontinued, and the pressure at the well bore is reduced to as low a value as possible. As a result of doing this at the time when substantial amounts of the semisolid tar have been heated and liquefied, and while a large amount of the steam condensate remains in the reservoir stratum, a pressure differential in the direction of the well bore is created, which rapidly moves the accumulated condensate and melted tar to the well bore. The force thus provided is generally proportional to the pressure at which steam was being injected prior to cut-off, and accordingly by utilizing steam at a sufficiently high pressure, it can be made may times as large as the gravity-drainage force, which would otherwise be the only substantial force available for inducing flow into the well bore.

As the pressure at the well bore is reduced and more rapid flow toward the well bore starts, the steam condensate is in part vaporized by the heat stored in the liquids and in the reservoir rock itself, so that some flashing of the condensate into steam occurs, adding to the gravity-drainage pressure to drive liquids toward the well bore. As compared with non-condensable gases, this flashing of the condensate into steam by the stored heat in the rock and in the liquids maintains the pressure in a sense, so that it drops more slowly than if it resulted merely from the expansion of compressed gases. As a result of this depressuring step, the efficiency of the process is increased several fold over that of a process utilizing gravity flow alone. Part of this increase in efficiency is due to the increased flow rate to the well bore, and part is due to the shorter length of time required to produce the oil recoverable from a single well bore, which thereby minimizes the heat loss to overlying formations.

The foregoing can perhaps be more easily visualized by reference to the drawing, which corresponds to FIGURE 1 of the above-mentioned patent. It shows a diagrammatic cross-section view of a heavy-oil-containing sand stratum 10 with an embodiment of our invention in operation therein during a period of steam injection. Stratum 10 is penetrated by a well conventionally equipped with a surface casing 16, a production casing 21 cemented through the stratum, and a tubing 25 extending to a screen 26 surrounded by a gravel pack 27 below the base of the stratum. Perforations 24 near the top of stratum 10 extend from the annulus outside tubing 25 through casing 21 and cement 22 into the body of stratum 10.

During an injection period, steam from a boiler 35 at the ground surface 13 flows down the annulus and out through perforations 24 into stratum 10. Fluids entering the well through pack 27 and screen 26 are produced through the tubing 25, using a pump 29 as required, or if necessary maintaining back pressure by a valve 38 to achieve desired flow rates.

The figure shows the stratum and well at an intermediate stage of steam injection and gravity-drainage production. A drained zone 42 surrounds the well in the upper part of the stratum, the heated oil and the condensate of the steam which heated it having been produced through tubing 25. The radial arrows in zone 42 generally depict the steam flow from perforations 24 to the melting and gravity drainage zone 43, which surrounds zone 42 and separates it from the unheated part of stratum 10.

Throughout zone 42 the temperature and pressure are relatively uniform. They may be, for example, about 400 degrees F. and 250 pounds per square inch, absolute, which correspond to the temperature and pressure of saturated steam. To understand why the temperature and pressure of zone 42 must be uniform, assume for a moment that at some point in the zone the temperature is less than 400 degrees F. The steam being present everywhere will immediately condense at this point until the heat released by the condensation brings it up to 400 degrees F. Then the condensation will cease.

Because of the nature of the heavy oil that it is substantially non-flowable at the normal reservoir temperature, the outer face of the melting zone 43 acts like the wall of a container or pressure vessel. That is, the 250 pounds per square inch pressure of the steam in zone 42 tends to force the heated hydrocarbons to flow radially away from the well. It is unable to do so, however, because the hydrocarbons congeal and plug the pore-space capillaries as soon as they contact the unheated formation. Thus, the outer surface of the melting zone 43 is where almost the entire pressure differential occurs between the 250 pounds per square inch of zone 42 and the low natural pressure of the stratum 10.

The temperature differential between the 400 degrees F. of zone 42 and the 50 degrees F., more or less (which is typical of the Athabasca tar) in the unheated formation outside of zone 43, is less abrupt. That is, most of the 350 degrees F. temperature drop occurs across the thickness of zone 42, although there is some warming of the formation immediately outside of the zone 43 before plastic flow of the tar and plugging of the pore space, which characterize the outer boundary of the zone, take place. Under the force of gravity, which acts completely independently of the force of the steam pressure, steam condensate and melted hydrocarbon at 400 degrees F. (and of nearly the same specific gravity) flow downwardly and inwardly toward the well most rapidly on the inner face of melting zone 43. Between the inner and outer faces of zone 43, the downward flow of the draining liquids is progressively slower, as the temperature decreases proceeding across the zone outwardly. The arrows in zone 43 show the general direction of liquid flow during gravity drainage.

The flow of heat by conduction through the zone 43, together with the gravity drainage of liquids downwardly and into the well bore, progressively exposes the unheated part of stratum 10 to the heat of the steam in zone 42, so that zone 42 enlarges, as zone 43 propagates radially outwardly from the well. This propagation is most rapid near the top of stratum 10 where the drainage is most rapid because zone 43 is there more nearly vertical.

Eventually a condition is reached where a large body of heated oil and condensate is present below and surrounding the base of zone 42, but the rate of its entry into the well bore is limited by the still substantial viscosity of the oil and the small force of gravity. It is at this time that the improvement forming the present invention comes into operation. Steam injection through perforations 24 is stopped, valve 38 is opened wide, and pump 29 is operated to reduce the pressure inside screen 26 rapidly to as low a value as possible.

Now, consider what happens to a droplet of steam condensate in the zone 43 at a representative point 44. It is initially at, say 350 degrees F. and 250 pounds per square inch, absolute, pressure. Due to the temperature drop across zone 43, its temperature is somewhat less than the maximum 400 degrees F. of the steam in zone 42. As liquid is drawn into the well bore, the pressure at 44 drops rapidly. When it becomes less than about 135 pounds per square inch, absolute, the droplet of condensate at 350 degress F. and in contact with sand and other liquids at the same temperature, can no longer remain a liquid but returns to vapor form, extracting its heat of vaporization from the heated solids and liquids surrounding it. With continuing pressure reduction, it expands as a gas and drives heated oil ahead of it toward the well bore.

What happens at point 44 is representative of the revaporization of steam condensate everywhere in the zone 43, as the pressure at each point drops below that corresponding to saturated steam for the temperature existing at that point within the zone. It is the relatively large force of this revaporized condensate within the body of accumulated liquids, compared with the smaller force of gravity drainage, that so effectively supplements the latter in the recovery process.

It is a matter of substantial importance in the application of the present invention to choose the proper time for cut-off of steam injection and reduction of the pressure at the well bore. If the steam injection is stopped and the pressure at the well bore is reduced too early in the life of a recovery project at the well, only a relatively small part of the oil in-place will be recovered during the pressure-drive stage because too small a volume of the reservoir has been heated and the condensate is close to the well where it is immediately produced without driving a quantity of oil ahead of it as occurs with late depressuring. On the other hand, if the cut-off of steam injection and reduction of well-bore pressure are delayed until a large body of condensate and heated oil accumulates and is ready to be produced into the well bore, reduction of the pressure at the well bore then accomplishes the rapid production of a large fraction of this oil.

In further substantiation of this aspect of our invention, the following experiments are cited. A model apparatus was constructed somewhat similar to that shown in FIGURE 2 of the above-mentioned Patent 2,881,838. The relative vertical and horizontal dimensions of the model were changed, however, so that the tar-sand body had a diameter of about 15 inches and a height of 3 inches.

Given these dimensions and this dimensional ratio, by choice of the proper sizes of sand particles, the model approximated a volume of the Athabasca tar sand 50 feet thick and 250 feet in diameter. From a consideration of the theoretical equations governing the flow of heat and the gravity drainage of liquids in porous media, it was calculated that 1 minute of operating time of the model was equivalent to about 28 days of operation in the field. A flow of 1 cubic centimeter per minute in the model was calculated to correspond to about 1.8 barrels per day of fluids produced in the field. For each of several test runs, the model was filled with a mixture of Athabasca tar and sized sand particles in substantially the ratio of their natural occurrence. Connate water was also present in substantially its natural concentration, but compared to the steam condensate its volume and effect were negligible.

With the model at room temperature, operation of each run was initiated by admitting into the perforated annulus around the central tube of the model, 400° F. saturated steam at a gauge pressure of about 235 pounds per square inch. Liquid was removed from the central tube as fast as it collected there by draining directly into a product vessel. A back pressure was held on the liquid-product receiver connected to the model to maintain the entire system under the desired pressure of 235 pounds per square inch except during the intervals when the model was depressured. At these times the input steam was shut off, and the product recovery was transferred to a receiver at atmospheric pressure. When the pressure in the model reached atmospheric, the depressuring was considered to be completed, and steam injection was immediately resumed. Each experimental run of the model was considered ended when the temperature at the top of the outside edge of the bed had risen 25° F. above its initial room-temperature value, steam injection then being completely stopped. This was equivalent to the arrival of heat at a radial distance of 125 feet from the well modeled.

In the accompanying Table I are shown the basic data obtained in four consecutive, directly comparable runs with this model. As will be immediately apparent from an inspection of this table, Runs 13, 14 and 16 produced rather similar results, both as regards the weight-percentage of recovery of the tar present in the model and as regards the water/tar ratio, which is a measure of the amount of steam injection required to obtain this production. In all of these tests, the amount of connate water present in the tar was negligible compared to the amount of condensate water produced by the introduced steam.

Table I.—Model data

| Run No. | 13 | 14 | 15 | 16 |
|---|---|---|---|---|
| Duration of test run in minutes | 17.5 | 32.0 | 21.0 | 21.0 |
| Temperature in degrees Fahrenheit | 400 | 400 | 397 | 400 |
| Production rates in cc./min. averaged over test duration: | | | | |
| Tar | 15.0 | 10.7 | 36.8 | 13.8 |
| Water | 115.1 | 77.6 | 106.6 | 96.2 |
| Total tar production in grams | 271 | 355 | 800 | 298 |
| Water/tar ratio averaged over run | 7.7 | 7.3 | 2.9 | 7.0 |
| Total weight percent of introduced tar recovered | 9.1 | 11.8 | 26.5 | 9.6 |

The results of Run 15, however, are markedly different, as is evident from the fact that the percentage-recovery is almost two and one-half times that of the average of the other three runs, whereas the amount of steam injected and condensate produced is very little different. This increase in tar production gives an over-all water/tar ratio of about 2.9 instead of an average of around 7.3 and thus represents a marked increase in efficiency of utilization of the injected steam.

The reason for this marked change in efficiency of operation is brought out in Table II showing the depressuring data applicable to these model runs. As is clear from this table, no depressuring of any sort was done during either of Runs 13 and 16, so that the sole recovery mechanism in operation for these runs was gravity drainage as described in the aforementioned patent. In the cases of Runs 14 and 15, however, one or more depressuring steps were carried out during the run, which steps comprised cutting off the input steam by closing an inlet valve and directing the fluids produced from the model into a receiver at atmospheric rather than elevated pressure until the pressure in the model vessel reached atmospheric.

is roughly proportional to the time involved, and no appreciable change in water-to-tar ratio was observed during the interval. It appears that there was no substantial body of heated oil and condensate formed and ready to be forced into the well bore.

In the case of Run 15, the early depressuring steps was carried out somewhat later in the duration of the run, namely, between 10 and 11.75 minutes after the start. Thus, this step was performed about midway in the duration of the run at a time when heating had probably occurred out from the well as a distance about equal to the formation thickness. Although not a significantly greater amount of tar was produced during this interval than in the depressing step of Run 14, it is apparent from the reduced water-to-tar ratio of 2.5 that there was some substantial benefit to carrying out the depressuring step at this time. In other words, there was an appreciable body of heated oil ready to be driven to the well bore by flashing condensate.

As compared with the second or later depressuring step, which was begun just after the 25° temperature rise had occurred at the outer edge of the model, the effect of this early depressuring step is relatively small. By starting the depressuring of the model at a time relatively late in the operation when there is a quite large body of heated tar and condensate in the formation, as is indicated by the occurrence of heating at a distance nearly two and one-half times the bed thickness from the well bore, more tar is produced during the late depressuring step than in all the rest of the operation put together. Furthermore, tar and condensate are produced in almost equal quantities rather than in the ratio of 1 to 7 characteristics of gravity drainage. Thus, the over-all effect of the late depressuring step is to more than double the amount of tar recovery for a given amount of input energy in the form of steam at elevated temperature and pressure. In summary, the too-early depressuring step of Run 14 is clearly below the lower time limit by which the present invention may be defined. The first depressuring step of Run 15 appears to be close to but above the minimum time duration of the steam-injecting step, when some of the benefits of the invention may be obtained. In other words, the initial period of steam injection should be at least about half as long as the time required for heat to propagate through a radial distance equal to 2.5 times the formation thickness. Preferably, it should be even longer, namely, about equal to the time for radial heat propagation out to a distance 2.0 to 2.5 times the formation thickness.

From temperature observations at various points in the model during the foregoing and other runs, it was found that the radial propagation of the tar-melting face at the top of the formation was approximately linear with time.

Table II.—Model depressuring data

| Run No. | 13 | 14 | 15 | 16 |
|---|---|---|---|---|
| Early depressuring interval | Not done | Between 4 and 9 minutes after start. | Between 10 and 11.75 minutes after start. | Not done. |
| Percent of produced tar obtained during early depressuring. | | 18 percent | 23.2 percent | |
| Water/tar ratio during this interval | | 7.8 | 2.5 | |
| Late depressuring interval | Not done | Not done | Between 18.75 and 21 minutes after start. | Not done. |
| Percent of produced tar obtained during late depressuring. | | | 57.3 percent | |
| Water/tar ratio during this interval | | | 1.1 | |

As will be seen from Table I, depressuring was used in different ways in Runs 14 and 15. From these runs it is possible to see the effect of a depressuring step carried out very early in the duration of a run as compared with carrying it out in the middle or much later in the run. Thus, in Run 14 only one depressuring step was performed, between the times of 4 and 9 minutes after the start of the run. This depressuring was obviously too early to have any appreciable effect on the results of the run, as the 18 percent of produced tar obtained during this time interval Both in the middle and at the end of each run, it was noted that the tar produced by gravity drainage was about 10 percent of the original tar in place within and underlying the heated zone.

This affords a very convenient way of estimating the radial propagation of the tar-melting face during a field operation. Knowing the volume of tar in place in a cylindrical volume of radius r around a well bore in a formation of known thickness, as can be determined by computation from measurements on cores, when 10 percent of this volume of tar has been recovered by gravity drainage, then the tar-melting face will have propagated a distance r from the well bore. The minimum time duration for the initial steam-injection step can thus be defined as extending until about 10 percent of the in-place oil within a cylindrical volume of radius equal to the formation thickness has been produced by gravity drainage. The preferred time for depressuring is when about 10 percent of the in-place oil within a cylindrical volume having a radius 2 to 2.5 times the formation thickness has been produced. Subsequent pressuring intervals in a series of alternate pressuring and depressuring steps should be of similar length, until there is substantial depletion, and/or heat losses to the overburden become prohibitive.

In terms of field operations, the above test results can be scaled up in accordance with the factors previously stated. The calculated field results from such scaling up of the model data are shown in Table III. Thus, the average production rate of 66.7 barrels of tar per day for Run 15 is more than double the best average production rate of 27.1 barrels of tar per day for Run 13. These are the calculated results obtainable from a tar formation 50 feet thick, heated out to a radius of 125 feet from the well bore. The over-all water-to-tar ratios for these production figures are the same as for the model and thus likewise demonstrate a marked improvement in utilization of the energy of the input steam.

Table III.—Calculated field results from scaled-up model data

| Run No. | 13 | 14 | 15 | 16 |
|---|---|---|---|---|
| Field time, years | 1.33 | 2.44 | 1.60 | 1.60 |
| Average production in barrels per day: | | | | |
| Tar | 27.1 | 19.4 | 66.7 | 25 |
| Water | 209 | 141 | 193 | 175 |
| Over-all water/tar ratio | 7.7 | 7.3 | 2.9 | 7.0 |

While the foregoing results of the model runs and calculated results of field operation are presented quantitatively, they are to be considered as only qualitative as regards actual field operation. The scaling factors between the model and the field operations are strictly applicable only to the case of gravity drainage (i.e., to Runs 13 and 16), and even for that case with a precision which is not completely known. While a depressuring step in field operations, performed at a time when the tar-melting face has propagated a distance from the well bore equal to two to two and one-half times the bed thickness, can certainly be expected to improve the efficiency of the operation by a substantial factor, it will probably be different from the 2.5 factor characterizing these model tests. Nevertheless, it is clear that the force of gravity drainage can be greatly supplemented in the manner set forth in the above description.

Although the model runs were terminated when heat had been carried radially by the steam out to about 2.5 times the stratum thickness, a field operation would probably not have reached its economic limit of recovery at a corresponding time. Thus, at the conclusion of production induced by the depressuring step designated as "late depressuring" above, the entire pressuring and depressuring cycle will be repeated one or more additional times. That is, steam injection at an elevated temperature and pressure will be resumed and continued until there is another large body of condensate and melted tar present in the formation. Depressuring will then bring this body of liquid rapidly to the well bore for recovery. As a result of the higher producing rates and greater steam economy accompanying this alternate pressuring and depressuring of the formation, a larger percentage of in-place tar or oil can be recovered before heat losses become prohibitive than can be recovered when gravity drainage alone is relied upon to move the liquids to the producing well.

While we have described our invention in terms of the foregoing specific examples and details, it is to be understood that other and further modifications of the procedure may be made in particular instances. The scope of the invention, therefore, should not be considered as limited to the details set forth, but it is properly to be ascertained from the appended claims.

We claim:

1. In a method of recovering, from an underground stratum in which it occurs, heavy oil which is substantially non-flowable by the application of driving-fluid pressure thereto and which retains substantial viscosity at elevated temperatures, said stratum being substantially completely penetrated by a well extending from the ground surface, which method comprises the steps of injecting substantially only steam at an elevated temperature and pressure into said well and thence into said stratum to heat by condensation substantially the entire stratum face exposed in said well and reduce the viscosity of the oil at said face, whereby heated oil and steam condensate flow downwardly by gravity drainage toward the bottom of said well and continuously expose unheated oil and formation behind said face, and withdrawing said heated oil and condensate from near the bottom of said well at substantially the rate they collect there while holding sufficient back pressure on said well to maintain said pressure and temperature at their elevated values within the heated volume of said stratum, whereby a zone of melting oil and gravity drainage of heated oil and steam condensate propagates radially outwardly from said well through at least the upper part of said stratum, the improvement which comprises performing said method as a series of alternating pressuring and depressuring steps in which each pressuring step comprises continuing said steam-injecting, withdrawing, and back-pressure-holding steps until there is an accumulation of heated heavy oil and steam condensate of substantial size in said stratum, and each depressuring step comprises releasing said back pressure and rapidly withdrawing fluids from near the bottom of said well to reduce the pressure at said well bore to a low value and thereby establish throughout said heated volume a substantial pressure gradient to aid the force of gravity drainage in moving said accumulation toward said well bore.

2. In a method of recovering, from an underground stratum in which it occurs, heavy oil which is substantially non-flowable by the application of driving-fluid pressure thereto and which retains substantial viscosity at elevated temperatures, said stratum being substantially completely penetrated by a well extending from the ground surface, which method comprises the steps of injecting substantially only steam at an elevated temperature and pressure into said well and thence into said stratum to heat by condensation substantially the entire stratum face exposed in said well and reduce the viscosity of the oil at said face, whereby heated oil and steam condensate flow downwardly by gravity drainage toward the bottom of said well and continuously expose unheated oil and formation behind said face, and withdrawing said heated oil and condensate from near the bottom of said well at substantially the rate they collect there while holding sufficient back pressure on said well to maintain said pressure and temperature at their elevated values within the heated volume of said stratum, whereby a zone of melting oil and gravity drainage of heated oil and steam condensate propagates radially outwardly from said well through at least the upper part of said stratum, the improvement which comprises performing said method as a series of alternating pressuring and depressuring steps, all of said pressuring steps being of approximately equal time duration, each of said pressuring steps comprising continuing said steam-injecting, withdrawing, and back-pressure-holding steps for a period of time at least as long as that required to produce by gravity drainage 10 percent of the in-place heavy oil in a cylindrical volume of said stratum surrounding said well of a radius equal to the stratum thickness, and each depressuring step comprising releasing said back-pressure and rapidly withdrawing fluids from near the bottom of said well to reduce the pressure at said well bore to a low value and thereby establish throughout said heated volume a substantial pressure gradient to aid the force of gravity drainage in moving said accumulation toward said well bore.

3. In a method of recovering, from an underground stratum in which it occurs, heavy oil which is substantially non-flowable by the application of driving-fluid pressure thereto and which retains substantial viscosity at elevated temperatures, said stratum being substantially completely penetrated by a well extending from the ground surface, which method comprises the steps of injecting substantially only steam at an elevated temperature and pressure into said well and thence into said stratum to heat by condensation substantially the entire stratum face exposed in said well and reduce the viscosity of the oil at said face, whereby heated oil and steam condensate flow downwardly by gravity drainage toward the bottom of said well and continuously expose unheated oil and formation behind said face, and withdrawing said heated oil and condensate from near the bottom of said well at substantially the rate they collect there while holding sufficient back pressure on said well to maintain said pressure and temperature at their elevated values within the heated volume of said stratum, whereby a zone of melting oil and gravity drainage of heated oil and steam condensate propagates radially outwardly from said well through at least the upper part of said stratum, the improvement which comprises performing said method as a series of alternating pressuring and depressuring steps, all of said pressuring steps being of approximately equal time duration, each of said pressuring steps comprising continuing said steam-injecting, withdrawing, and back-pressure-holding steps for a period of time equal to that required to produce by gravity drainage 10 percent of the in-place heavy oil in a cylindrical volume surrounding said well and of a radius between about 2.0 and 2.5 times the stratum thickness, and each depressuring step comprising releasing said back pressure and rapidly withdrawing fluids from near the bottom of said well to reduce the pressure at said well bore to a low value and thereby establish throughout said heated volume a substantial pressure gradient to aid the force of gravity drainage in moving said accumulation toward said well bore.

4. In a method of recovering, from an underground stratum in which it occurs, heavy oil which is substantialy non-flowable by the application of driving-fluid pressure thereto and which retains substantial viscosity at elevated temperatures, said stratum being substantially completely penetrated by a well extending from the ground surface, which method comprises the steps of injecting substantially only steam at an elevated temperature and pressure into said well and thence into said stratum to heat by condensation substantially the entire stratum face exposed in said well and reduce the viscosity of the oil at said face, whereby heated oil and steam condensate flow downwardly by gravity drainage toward the bottom of said well and continuously expose unheated oil and formation behind said face, and withdrawing said heated oil and condensate from near the bottom of said well at substantially the rate they collect there while holding sufficient back pressure on said well to maintain said pressure and temperature at their elevated values within the heated volume of said stratum, whereby a zone of melting oil and gravity drainage of heated oil and steam condensate propagates radially outwardly from said well through at least the upper part of said stratum, the improvement which comprises the steps of discontinuing said steam-injecting, withdrawing and back-pressure-holding steps at a time when there is an accumulation of heated heavy oil and steam condensate of substantial size within said stratum, and rapidly withdrawing fluids from near the bottom of said well to reduce the pressure at said well bore to a low value and thereby establish throughout said heated volume a substantial pressure gradient to aid the force of gravity drainage in moving said accumulation toward said well bore.

5. In a method of recovering, from an underground stratum in which it occurs, heavy oil which is substantially non-flowable by the application of driving-fluid pressure thereto and which retains substantial viscosity at elevated temperatures, said stratum being substantially completely penetrated by a well extending from the ground surface, which method comprises the steps of injecting substantially only steam at an elevated temperature and pressure into said well and thence into said stratum to heat by condensation substantially the entire stratum face exposed in said well and reduce the viscosity of the oil at said face, whereby heated oil and steam condensate flow downwardly by gravity drainage toward the bottom of said well and continuously expose unheated oil and formation behind said face, and withdrawing said heated oil and condensate from near the bottom of said well at substantially the rate they collect there while holding sufficient back pressure on said well to maintain said pressure and temperature at their elevated values within the heated volume of said stratum, whereby a zone of melting oil and gravity drainage of heated oil and steam condensate propagates radially outwardly from said well through at least the upper part of said stratum, the improvement which comprises the steps of discontinuing said steam-injecting, withdrawing, and back-pressure-holding steps at a time when said zone has propagated radially from said well a distance which is at least as great as the stratum thickness, and rapidly withdrawing fluids from near the bottom of said well to reduce the pressure at said well bore to a low value and thereby establish throughout said heated volume a substantial pressure gradient to aid the force of gravity drainage in moving said accumulation toward said well bore.

6. In a method of recovering, from an underground stratum in which it occurs, heavy oil which is substantially non-flowable by the application of driving-fluid pressure thereto and which retains substantial viscosity at elevated temperatures, said stratum being substantially completely penetrated by a well extending from the ground surface, which method comprises the steps of injecting substantially only steam at an elevated temperature and pressure into said well and thence into said stratum to heat by condensation substantially the entire stratum face exposed in said well and reduce the viscosity of the oil at said face, whereby heated oil and steam condensate flow downwardly by gravity drainage toward the bottom of said well and continuously expose unheated oil and formation behind said face, and withdrawing said heated oil and condensate from near the bottom of said well at substantially the rate they collect there while holding sufficient back pressure on said well to maintain said pressure and temperature at their elevated values within the heated volume of said stratum, whereby a zone of melting oil and gravity drainage of heated oil and steam condensate propagates radially outwardly from said well through at least the upper part of said stratum, the improvement which comprises the steps of discontinuing said steam-injecting, withdrawing, and back-pressure-holding steps at a time when said zone has propagated radially from said well a distance between about 2.0 and 2.5 times the stratum thickness, and rapidly withdrawing fluids from near the bottom of said well to reduce the pressure at said well bore to a low value and thereby establish throughout said heated volume a substantial pressure gradient to aid the force of gravity drainage in moving said accumulation toward said well bore.

7. In a method of recovering, from an underground stratum in which it occurs, heavy oil which is substantially non-flowable by the application of driving-fluid pressure thereto and which retains substantial viscosity at elevated temperatures, said stratum being substantially completely penetrated by a well extending from the ground surface, which method comprises the steps of injecting substantially only steam at an elevated temperature and pressure into said well and thence into said stratum to heat by condensation substantially the entire stratum face exposed in said well and reduce the viscosity of the oil at said face, whereby heated oil and steam condensate flow downwardly by gravity drainage toward the bottom of said well and continuously exposed unheated oil and formation behind said face, and withdrawing said heated oil and condensate from near the bottom of said well at substantially the rate they collect there while holding sufficient back pressure on said well to maintain said pressure and temperature at their elevated values within the heated volume of said stratum, whereby a zone of melting oil and gravity drainage of heated oil and steam condensate propagates radially outwardly from said well through at least the upper part of said stratum, the improvement which comprises the steps of discontinuing said steam-injecting, withdrawing, and back-pressure-holding steps at a time when at least 10 percent of the in-place heavy oil in a cylindrical volume of said stratum surrounding said well and of a radius equal to the stratum thickness has been produced by gravity drainage, and rapidly withdrawing fluids from near the bottom of said well to reduce the pressure at said well bore to a low value and thereby establish throughout said heated volume a substantial pressure gradient to aid the force of gravity drainage in moving said accumulation toward said well bore.

8. In a method of recovering, from an underground stratum in which it occurs, heavy oil which is substantially non-flowable by the application of driving-fluid pressure thereto and which retains substantial viscosity at elevated temperatures, said stratum being substantially completely penetrated by a well extending from the ground surface, which method comprises the steps of injecting substantially only steam at an elevated temperature and pressure into said well and thence into said stratum to heat by condensation substantially the entire stratum face exposed in said well and reduce the viscosity of the oil at said face, whereby heated oil and steam condensate flow downwardly by gravity drainage toward the bottom of said well and continuously expose unheated oil and formation behind said face, and withdrawing said heated oil and condensate from near the bottom of said well at substantially the rate they collect there while holding sufficient back pressure on said well to maintain said pressure and temperature at their elevated values within the heated volume of said stratum, whereby a zone of melting oil and gravity drainage of heated oil and steam condensate propagates radially outwardly from said well through at least the upper part of said stratum, the improvement which comprises the steps of discontinuing said steam-injecting, withdrawing, and back-pressure-holding steps at a time when 10 percent of the in-place heavy oil in a cylindrical volume of said stratum surrounding said well and of a radius between about 2.0 and 2.5 times the stratum thickness has been produced by gravity drainage, and rapidly withdrawing fluids from near the bottom of said well to reduce the pressure at said well bore to a low value and thereby establish through said heated volume a substantial pressure gradient to aid the force of gravity drainage in moving said accumulation toward said well bore.

*9. In a method of recovering, from an underground stratum in which it occurs, heavy oil, said stratum being penetrated by a well extending from the ground surface, which method comprises the steps of injecting steam at an elevated temperature and pressure into said well and thence into said stratum to heat by condensation substantially the entire stratum face exposed in said well and reduce the viscosity of the oil at said face, whereby heated oil and steam condensate flow downwardly by gravity drainage toward the bottom of said well and continuously expose unheated oil and formation behind said face, and withdrawing said heated oil and condensate from near the bottom of said well at substantially the rate they collect there while holding sufficient back pressure on said well to maintain said pressure and temperature at their elevated values within the heated volume of said stratum, whereby a zone of heated oil and gravity drainage of said oil and steam condensate propagates radially outwardly from said well through at least the upper part of said stratum, the improvement which comprises performing said method as a series of alternating pressuring and depressuring steps in which each pressuring step comprises continuing injection of steam, withdrawing, and back-pressure-holding steps until there is an accumulation of heated heavy oil and steam condensate of substantial size in said stratum, and each depressuring step comprises releasing said back pressure and rapidly withdrawing fluids from near the bottom of said well to reduce the pressure at said well bore to a low value and thereby establish throughout said heated volume a substantial pressure gradient to aid the force of gravity drainage in moving said accumulation toward said well bore.*

*10. In a method of recovering, from an underground stratum in which it occurs, heavy oil, said stratum being penetrated by a well extending from the ground surface, which method comprises the steps of injecting steam at an elevated temperature and pressure into said well and thence into said stratum to heat by condensation substantially the entire stratum face exposed in said well and reduce the viscosity of the oil at said face, whereby heated oil and steam condensate flow downwardly by gravity drainage toward the bottom of said well and continuously expose unheated oil and formation behind said face, and withdrawing said heated oil and condensate from near the bottom of said well at substantially the rate they collect there while holding sufficient back pressure on said well to maintain said pressure and temperature at their elevated values within the heated volume of said stratum, whereby a zone of heated oil and gravity drainage of said heated oil and steam condensate propagates radially outwardly from said well through at least the upper part of said stratum, the improvement which comprises the steps of discontinuing said steam-injecting, withdrawing, and back-pressure-holding steps at a time when said zone has propagated radially from said well a distance which is at least as great as the stratum thickness, and rapidly withdrawing fluids from near the bottom of said well to reduce the pressure at said well bore to a low value and thereby causing part of said condensate to be vaporized by the heat stored in the liquids and in the reservoir rock itself so that some flashing of said condensate into steam occurs, thus adding to the force of gravity drainage in moving said accumulation toward said well bore.*

References Cited by the Examiner

The following references, cited by the Examiner, are of record in the patented file of this patent or the original patent.

UNITED STATES PATENTS

| | | | |
|---|---|---|---|
| 2,412,765 | 12/1946 | Buddrus et al. | |
| 2,862,558 | 12/1958 | Dixon. | |
| 2,881,838 | 4/1959 | Morse et al. | |
| 3,126,961 | 3/1963 | Craig et al. | 166—40 |
| 3,155,160 | 11/1964 | Craig et al. | 166—40 |

CHARLES E. O'CONNELL, *Primary Examiner.*